(12) United States Patent
Ban et al.

(10) Patent No.: US 11,535,722 B2
(45) Date of Patent: Dec. 27, 2022

(54) METHOD FOR PRODUCING FOAM, AND FOAM PRODUCED THEREBY

(71) Applicant: LOTTE CHEMICAL CORPORATION, Seoul (KR)

(72) Inventors: Kyun Ha Ban, Uiwang-si (KR); Won Ko, Uiwang-si (KR); Yun Seok Bae, Uiwang-si (KR); Kee Hae Kwon, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 318 days.

(21) Appl. No.: 16/759,813

(22) PCT Filed: Oct. 10, 2018

(86) PCT No.: PCT/KR2018/011884
§ 371 (c)(1),
(2) Date: Apr. 28, 2020

(87) PCT Pub. No.: WO2019/088486
PCT Pub. Date: May 9, 2019

(65) Prior Publication Data
US 2020/0308361 A1 Oct. 1, 2020

(30) Foreign Application Priority Data
Oct. 30, 2017 (KR) .................. 10-2017-0142187

(51) Int. Cl.
| *C08J 9/14* | (2006.01) |
| *C08L 25/08* | (2006.01) |
| *C08J 9/00* | (2006.01) |
| *B29C 48/00* | (2019.01) |
| *B29C 45/00* | (2006.01) |
| *C08L 77/06* | (2006.01) |
| *B29K 25/00* | (2006.01) |
| *B29K 77/00* | (2006.01) |
| *B29K 105/00* | (2006.01) |
| *B29K 105/04* | (2006.01) |
| *B29K 105/12* | (2006.01) |
| *B29K 309/08* | (2006.01) |

(52) U.S. Cl.
CPC ......... *C08J 9/0085* (2013.01); *B29C 45/0001* (2013.01); *B29C 48/0012* (2019.02); *C08J 9/142* (2013.01); *C08L 25/08* (2013.01); *C08L 77/06* (2013.01); *B29K 2025/00* (2013.01); *B29K 2077/00* (2013.01); *B29K 2105/0088* (2013.01); *B29K 2105/04* (2013.01); *B29K 2105/12* (2013.01); *B29K 2309/08* (2013.01); *C08J 2201/03* (2013.01); *C08J 2203/12* (2013.01); *C08J 2325/08* (2013.01); *C08J 2377/06* (2013.01); *C08J 2425/08* (2013.01); *C08J 2477/06* (2013.01)

(58) Field of Classification Search
CPC ...... C08J 9/0085; C08J 9/142; C08J 2201/03; C08J 2203/12; C08J 2325/08; C08J 2377/06; C08J 2425/08; C08J 2477/06; C08J 9/0066; C08J 2203/02; C08J 2203/10; C08J 9/0061; B29C 45/0001; B29C 48/0012; B29C 44/0492; B29C 44/3442; B29C 44/42; B29C 44/04; B29C 48/022; B29C 48/16; C08L 25/08; C08L 77/06; B29K 2025/00; B29K 2077/00; B29K 2105/0088; B29K 2105/04; B29K 2105/12; B29K 2309/08
See application file for complete search history.

(56) References Cited

U.S. PATENT DOCUMENTS

| 4,442,232 A | 4/1984 | Kajimura et al. |
| 2007/0100008 A1* | 5/2007 | Chang ............... C08J 9/122 521/79 |
| 2012/0316261 A1 | 12/2012 | Bradley |
| 2018/0237630 A1 | 8/2018 | Bae et al. |
| 2018/0312660 A1 | 11/2018 | Schultz et al. |
| 2019/0022903 A1 | 1/2019 | Kito et al. |

FOREIGN PATENT DOCUMENTS

| EP | 2513228 A1 | 10/2012 |
| EP | 2520610 A1 | 11/2012 |
| EP | 3357965 A1 | 8/2018 |
| EP | 3428224 A1 | 1/2019 |
| JP | 06-032912 A | 2/1994 |
| JP | 07-207109 A | 8/1995 |
| JP | 2009-120705 A | 6/2009 |

(Continued)

OTHER PUBLICATIONS

Search Report in counterpart European Application No. 18874644.0 dated Jul. 13, 2021, pp. 1-5.

(Continued)

*Primary Examiner* — Irina S Zemel
(74) *Attorney, Agent, or Firm* — Additon, Pendleton & Witherspoon, P.A.

(57) ABSTRACT

The present invention relates to a method for producing foam and foam produced thereby. The method for producing foam includes a step for producing foam by kneading and injection molding a first extrusion product and a second extrusion product, wherein the first extrusion product is obtained by extruding a first composition including an aromatic vinyl-based resin, and the second extrusion product is obtained by extruding a second composition including a polyamide resin and a foaming agent.

15 Claims, 1 Drawing Sheet

(56) References Cited

FOREIGN PATENT DOCUMENTS

| | | |
|---|---|---|
| JP | 2014-047320 A | 3/2014 |
| JP | 6084406 B2 | 2/2017 |
| KR | 10-0638118 B1 | 10/2006 |
| KR | 10-0703823 B1 | 3/2007 |
| KR | 10-2016-0061463 A | 6/2016 |
| KR | 10-1682530 B1 | 12/2016 |
| WO | 2017/057904 A1 | 4/2017 |
| WO | 2017/060344 A1 | 4/2017 |
| WO | 2017/155114 A1 | 3/2018 |
| WO | 2019/088486 A1 | 5/2019 |

OTHER PUBLICATIONS

International Search Report in counterpart International Application No. PCT/KR2018/011884 dated Jan. 9, 2019, pp. 1-4.

\* cited by examiner

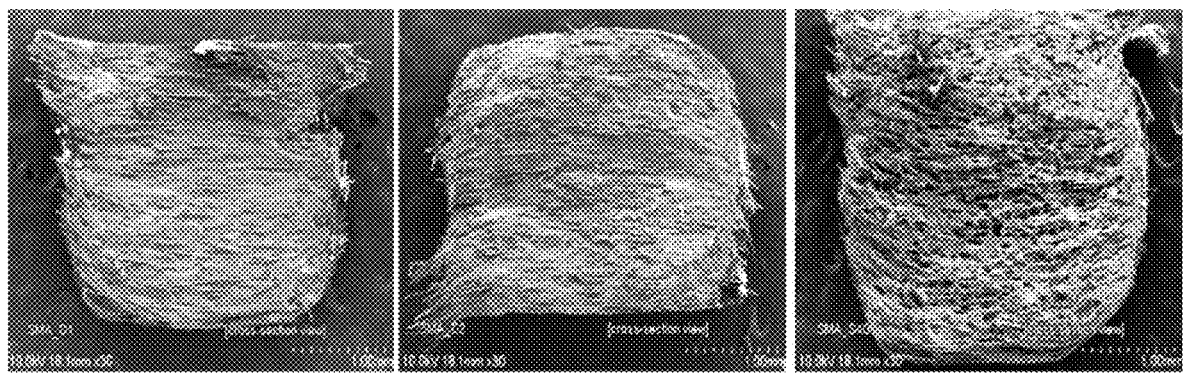
(a) Example 1 (first extrudate)  (b) Example 2 (second extrudate)  (c) Comparative Example 1 (third extrudate)

METHOD FOR PRODUCING FOAM, AND FOAM PRODUCED THEREBY

CROSS-REFERENCE TO RELATED APPLICATIONS

This application claims priority to and the benefit of International Application No. PCT/KR2018/011884, filed Oct. 10, 2018, which published as WO 2019/088486 on May 9, 2019, and Korean Patent Application No. 10-2017-0142187, filed in the Korean Intellectual Property Office on Oct. 30, 2017, the entire disclosure of each of which is incorporated herein by reference.

TECHNICAL FIELD

The present invention relates to a method of producing foam and foam produced by the same.

BACKGROUND ART

Thermoplastic resin compositions widely used in various fields include reinforcing fillers, such as glass fibers, to improve heat resistance and mechanical strength, such as stiffness, depending on applications thereof. However, despite having good mechanical strength, such a thermoplastic resin composition including reinforcing fillers has problems of deterioration in surface properties or processability and increase in specific gravity with increasing content of the reinforcing fillers.

Formable resins (or foams) allow weight reduction due to expandability thereof while having good impact resistance, mechanical strength, processability, and surface properties, and thus can be used in a wide range of fields, such as electrical/electronic products, automotive interior/exterior parts, and the like.

Such a formable resin is produced into foam by foaming the resin using a chemical forming agent or a mechanical device, and there have been attempts to improve dimensional stability and heat resistance of the foam using various materials.

However, these attempts have problems of insignificant weight reduction due to still relatively high specific gravity of a foam product and difficulty in improving quality stability. Therefore, there is a need for a technique which can significantly reduce specific gravity of a foam product while improving physical properties of the foam product, such as heat resistance and dimensional stability.

The background technique of the present invention is disclosed in U.S. Pat. No. 4,442,232 and the like.

DISCLOSURE

Technical Problem

It is one aspect of the present invention to provide a method of producing foam, which can secure high foaming efficiency upon injection molding.

It is another aspect of the present invention to provide a method of producing foam, which can produce foam having good properties in terms of dimensional stability, impact resistance, and heat resistance.

It is a further aspect of the present invention to provide a method of producing foam, which can produce foam that is lightweight due to a low specific gravity thereof.

It is yet another aspect of the present invention to provide foam produced by the method of producing foam set forth above.

Technical Solution

One aspect of the present invention relates to a method of producing foam. In one embodiment, the method foam includes: producing foam by kneading and injection molding a first extrudate and a second extrudate, wherein the first extrudate is obtained by extruding a first composition including an aromatic vinyl resin and the second extrudate is obtained by extruding a second composition including a polyamide resin and a foaming agent.

In one embodiment, at least one of the first composition and the second composition may further include reinforcing fillers, wherein the reinforcing fillers may include at least one selected from carbon fibers, glass fibers, and mineral fillers.

In one embodiment, the aromatic vinyl resin may have a glass transition temperature (Tg) of about 130° C. to about 180° C. and a weight average molecular weight of about 50,000 g/mol to about 200,000 g/mol.

In one embodiment, the polyamide resin may be an aliphatic polyamide resin.

In one embodiment, the second composition may include about 50 parts by weight to about 250 parts by weight of the polyamide resin and 0.01 parts by weight to about 15 parts by weight of the foaming agent relative to 100 parts by weight of the aromatic vinyl resin.

In one embodiment, the reinforcing fillers included in at least one of the first composition and the second composition may be present in an amount of about 40 parts by weight to about 200 parts by weight relative to 100 parts by weight of the aromatic vinyl resin.

In one embodiment, the polyamide resin and the aromatic vinyl resin may be present in a weight ratio of about 1:0.5 to about 1:2.

In one embodiment, at least one of the first composition and the second composition may further include an impact modifier.

In one embodiment, the impact modifier and the aromatic vinyl resin may be present in a weight ratio of about 1:0.8 to about 1:3.

In one embodiment, the first composition may further include a compatibilizer.

In one embodiment, the foaming agent may include a montan wax.

In one embodiment, a difference in specific gravity between the first extrudate and the second extrudate may be about 0.5 or less, as measured in accordance with ASTM D792.

In one embodiment, the first extrudate and the second extrudate may be kneaded and injection molded at an injection molding temperature of about 250° C. or higher.

Another aspect of the present invention relates to foam produced by the method of producing foam set forth above.

In one embodiment, the foam may have a specific gravity of about 1.0 to about 1.4, as measured in accordance with ASTM D792, and a notched Izod impact strength of about 4 kgf·cm/cm to about 40 kgf·cm/cm, as measured on a ¼" thick specimen in accordance with ASTM D256.

Advantageous Effects

The present invention provides a method of producing foam, which can secure high foaming efficiency and can produce foam that has good properties in terms of dimensional stability, impact resistance, and heat resistance and is lightweight due to low specific gravity thereof.

DESCRIPTION OF DRAWINGS

FIG. 1(a) is a scanning electron microscopy (SEM) image showing a cross-section of a first extrudate prepared in an example according to the present invention, FIG. 1(b) is an SEM image showing a cross-section of the second extrudate prepared in the example, and FIG. 1(c) is an SEM image showing a cross-section of a third extrudate prepared in a comparative example.

BEST MODE

Description of known functions and constructions which may unnecessarily obscure the subject matter of the present invention will be omitted.

Further, terms to be described below are defined in consideration of functions of the present invention, and these may vary with the intention or practice of a user or an operator. Therefore, such terms should be defined based on the entire disclosure.

Method of Producing Foam

One aspect of the present invention relates to a method for producing foams. In one embodiment, the method for producing foams includes: producing foam by kneading and injection molding a first extrudate and a second extrudate, the first extrudate being obtained by extruding a first composition including an aromatic vinyl resin and the second extrudate being obtained by extruding a second composition including a polyamide resin and a foaming agent.

First Composition

The first composition includes an aromatic vinyl resin.

Aromatic Vinyl Resin

The aromatic vinyl resin is a copolymer of an aromatic vinyl monomer and maleic anhydride, and serves to improve dimensional stability and heat resistance of the foam according to the present invention in combination with reinforcing fillers and the like.

In one embodiment, the aromatic vinyl resin may be obtained by polymerizing a monomer mixture including an aromatic vinyl monomer and maleic anhydride by any known polymerization method, such as emulsion polymerization, solution polymerization, suspension polymerization, or mass polymerization, or may be a commercially available product.

In some embodiments, the aromatic vinyl monomer may include, for example, styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene, without being limited thereto. These may be used alone or as a mixture thereof. For example, the aromatic vinyl resin may be a styrene-maleic anhydride copolymer.

In one embodiment, the aromatic vinyl monomer may be present in an amount of about 60 mol % to about 95 mol %, for example, about 65 mol % to about 90 mol %, based on the total number of moles of the monomer mixture (the aromatic vinyl monomer and the maleic anhydride). The maleic anhydride may be present in an amount of about 5 mol % to about 40 mol %, for example, about 10 mol % to about 35 mol %, based on the total number of moles of the monomer mixture. Within this range, the foam according to the present invention can have good properties in terms of dimensional stability and heat resistance.

In some embodiments, the aromatic vinyl resin may have a weight average molecular weight of about 50,000 g/mol to about 200,000 g/mol, as measured by gel permeation chromatography (GPC). Within this range, the foam according to the present invention can have good properties in terms of dimensional stability, impact resistance, and heat resistance. For example, the aromatic vinyl resin may have a weight average molecular weight of about 80,000 g/mol to about 150,000 g/mol, as measured by GPC.

In one embodiment, the aromatic vinyl resin may have a glass transition temperature (Tg) of about 130° C. to about 180° C. Within this range, the foam according to the present invention can have good properties in terms of impact resistance and processability. For example, the aromatic vinyl resin may have a glass transition temperature (Tg) of about 140° C. to about 160° C. In addition, the aromatic vinyl resin may have a processing temperature of about 180° C. to about 240° C. Within this range, the foam according to the present invention can have good properties in terms of impact resistance and processability.

In one embodiment, the first extrudate may be prepared in pellet form by introducing the aforementioned components of the first composition into an extruder, followed by extrusion at an extruder barrel temperature of about 180° C. to about 240° C. In one embodiment, the first extrudate may have a size of about 1 mm to about 10 mm. Herein, the "size" refers to a maximum length of the first extrudate. Within this range of size of the first extrudate, the first extrudate can have good properties in terms of mixability and moldability.

Second Composition

The second composition includes a polyamide resin and a foaming agent.

Polyamide Resin

In one embodiment, the polyamide resin may include at least one selected from the group of an aliphatic polyamide resin and an aromatic polyamide resin.

In one embodiment, the polyamide resin may include an aliphatic polyamide resin. The aliphatic polyamide resin may contain, for example, a $C_4$ to $C_{30}$ aliphatic group and/or a $C_4$ to $C_{30}$ alicyclic group.

In one embodiment, the aliphatic polyamide resin may be a homopolymer, copolymer, terpolymer, or multicomponent copolymer formed from an aminocarboxylic acid, a lactam or diamine, and a dicarboxylic acid. Here, the term "copolymer" refers to a polyamide having at least two amide and/or diamide molecular repeat units.

The aminocarboxylic acid may be a $C_6$ to $C_{12}$ aminocarboxylic acid. Examples of the aminocarboxylic acid may include 6-aminocaproic acid, 7-aminoheptanoic acid, 9-aminononanoic acid, 11-aminoundecanoic acid, and 12-aminododecanoic acid.

The lactam may be a $C_4$ to $C_{12}$ lactam. Examples of the lactam may include α-pyrrolidone, ε-caprolactam, ω-laurolactam, and ε-enantolactam.

The diamine may be an aliphatic or alicyclic diamine. Examples of the diamine may include tetramethylenediamine, hexamethylenediamine, 2-methylpentamethylenediamine, nonamethylenediamine, undecamethylenediamine, dodecamethylenediamine, 2,2,4-trimethylhexamethylenediamine, 2,4,4-trimethylhexamethylenediamine, 5-methylnonamethylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, bis(p-aminocyclohexyl)methane, 2-methyloctamethylenediamine, trimethylhexamethylenediamine, 1,8-diaminooctane, 1,9-diaminononane, 1,10-diaminodecane, and 1,12-diaminododecane.

The dicarboxylic acid may be an aliphatic or alicyclic dicarboxylic acid. Examples of the dicarboxylic acid may include adipic acid, 2-methyladipic acid, trimethyladipic acid, glutaric acid, 2,2-dimethylglutaric acid, pimelic acid, suberic acid, azelaic acid, sebacic acid, dodecanedioic acid, 1,4-cyclohexanedicarboxylic acid, malonic acid, dimethylmalonic acid, succinic acid, and 2,2-diethylsuccinic acid.

In one embodiment, the aliphatic polyamide resin may include polyamide 6, polyamide 66, polyamide 46, polyamide 610, polyamide 612, polyamide 11, polyamide 12, polyamide 910, polyamide 912, polyamide 913, polyamide 914, polyamide 915, polyamide 616, polyamide 936, polyamide 1010, polyamide 1012, polyamide 1013, polyamide 1014, polyamide 1210, polyamide 1212, polyamide 1213, polyamide 1214, polyamide 614, polyamide 615, polyamide 616, and polyamide 613. These may be used alone or as a mixture thereof, as needed.

In one embodiment, the aliphatic polyamide resin may include at least one selected from the group of polyamide 1010, polyamide 1012, polyamide 6, and polyamide 66. In this embodiment, the foam can have further improved properties in terms of impact resistance, heat resistance, and processability.

In one embodiment, the polyamide resin may have a glass transition temperature (Tg) of about 30° C. to about 90° C. For example, the glass transition temperature of the polyamide resin may be about 50° C. to about 70° C. In addition, the polyamide resin may have a melting point (Tm) of about 160° C. to about 210° C. When the glass transition temperature and melting point of the polyamide resin fall within these ranges, the foam can have good properties in terms of impact resistance and processability.

In one embodiment, the polyamide resin may have an intrinsic viscosity (IV) of about 1.0 dL/g to about 3.0 dL/g, as measured using an Ubbelohde viscometer in a strong (96%) sulfuric acid solution at 25° C. Within this range, good moldability can be ensured upon production of the foam.

In one embodiment, the polyamide resin may have a number average molecular weight (Mn) of about 10,000 g/mol to about 200,000 g/mol, without being limited thereto. Within this range, the foam can have further improved properties in terms of impact resistance and processability. For example, the polyamide resin may have a number average molecular weight (Mn) of about 20,000 g/mol to about 150,000 g/mol.

In one embodiment, the polyamide resin may be present in an amount of about 50 parts by weight to about 250 parts by weight relative to 100 parts by weight of the aromatic vinyl resin. Within this range, the foam according to the present invention can have good heat resistance. For example, the polyamide resin may be present in an amount of about 80 parts by weight to about 150 parts by weight relative to 100 parts by weight of the aromatic vinyl resin. For another example, the polyamide resin may be present in an amount of about 90 parts by weight to about 110 parts by weight relative to 100 parts by weight of the aromatic vinyl resin.

In one embodiment, the polyamide resin and the aromatic vinyl resin may be present in a weight ratio of about 1:0.5 to about 1:2. Within this range, the foam can have good properties in terms of heat resistance, impact resistance, and dimensional stability. For example, the polyamide resin and the aromatic vinyl resin may be present in a weight ratio of about 1:1 to about 1:2.

Foaming Agent

The forming agent does not react with the polyamide resin of the second composition and reacts with the aromatic vinyl resin of the first extrudate upon kneading and injection molding of the first extrudate and the second extrudate to generate carbon dioxide ($CO_2$) gas or water vapor ($H_2O$) to form the foam.

In one embodiment, the foaming agent may include a montan wax. For example, the foaming agent may include montanic acid ester wax. When the second composition includes the foaming agent, formation of the foam can be facilitated since the foaming agent reacts with the aromatic vinyl resin of the first extrudate to foam the aromatic vinyl resin without reacting with the polyamide resin of the second composition.

In one embodiment, the foaming agent may be present in an amount of about 0.01 parts by weight to about 15 parts by weight relative to 100 parts by weight of the aromatic vinyl resin. Within this range, high foaming efficiency can be secured upon production of the foam according to the present invention. For example, the foaming agent may be present in an amount of about 0.1 parts by weight to about 5 parts by weight relative to 100 parts by weight of the aromatic vinyl resin.

Reinforcing Fillers

In one embodiment, at least one of the first composition and the second composition may further include reinforcing fillers. The reinforcing fillers serve to improve mechanical properties of the foam, such as heat resistance and stiffness. In one embodiment, the reinforcing fillers may include at least one selected from the group of carbon fibers, glass fibers, and mineral fillers. For example, the reinforcing fillers may include glass fibers.

In one embodiment, the carbon fibers and the glass fibers may have a circular or elliptical cross-section. In some embodiments, the carbon fibers and the glass fibers may have a length/diameter (L/D) ratio, that is, an aspect ratio, of about 1 to about 20, as measured on a bundle thereof. Within this range of aspect ratio of the reinforcing fillers, the foam can have good properties in terms of dimensional stability and heat resistance.

In one embodiment, the carbon fibers may have an average particle diameter of about 1 μm to about 12 μm, for example, about 3 μm to about 10 μm, and an average length of about 0.1 mm to about 12 mm, for example, about 0.1 mm to about 5 mm. Within these ranges, the foam can have good properties in terms of heat resistance and stiffness.

In one embodiment, the glass fibers may have an average particle diameter of about 8 μm to about 20 μm, for example, about 10 μm to about 13 μm, and an average length of about 0.1 mm to about 6 mm, for example, about 0.1 mm to about 4 mm. Within these ranges, the foam can have good properties in terms of heat resistance and stiffness. In one embodiment, the glass fibers may be partially or entirely coated on the surfaces thereof with a silane coupling agent or the like to have improved compatibility with the polyamide resin, without being limited thereto.

In one embodiment, examples of the mineral fillers may include talc, wollastonite, whiskers, mica, basalt fibers, and combinations thereof, without being limited thereto. In one embodiment, the mineral fillers may have various shapes, such as fibrous, particulate, rod-like, needle-like, flake, and amorphous shapes, and various cross-sections, such as circular, elliptical, and rectangular cross-sections. In addition, the mineral fillers may have an average particle diameter of about 50 nm to about 100 μm, without being limited thereto.

In one embodiment, the reinforcing fillers may be present in an amount of about 40 parts by weight to about 200 parts by weight relative to 100 parts by weight of the aromatic vinyl resin. Within this range, the foam can have good properties in terms of heat resistance, impact resistance, dimensional stability, and balance therebetween. For example, the reinforcing fillers may be present in an amount of about 60 parts by weight to about 170 parts by weight relative to 100 parts by weight of the aromatic vinyl resin.

For example, the reinforcing fillers may be included in at least one of the first composition and the second composition. For example, the reinforcing fillers may be present in the first composition in an amount of about 40 parts by weight to about 100 parts by weight relative to 100 parts by weight of the aromatic vinyl resin and may be present in the second composition in an amount of about 20 parts by weight to about 70 parts by weight relative to 100 parts by weight of the aromatic vinyl resin.

In one embodiment, the second extrudate may be prepared in pellet form by introducing the second composition into an extruder, followed by extrusion at an extruder barrel temperature of about 180° C. to about 240° C. Under these conditions, the foaming agent can be prevented from reacting with the other components of the second composition, thereby preventing the second extrudate from being foamed. In one embodiment, the second extrudate may have a size of about 1 mm to about 10 mm. Herein, the "size" refers to a maximum length of the second extrudate. Within this range of size of the second extrudate, the second extrudate can have good mixability and moldability.

Impact Modifier

In one embodiment, at least one of the first composition and the second composition may further include an impact modifier. The impact modifier may be an impact modifier that does not react with the foaming agent in the process of injection molding after mixing the first extrudate with the second extrudate according to the present invention.

The impact modifier may include at least one selected from the group of a modified olefin copolymer and a rubber-modified aromatic vinyl graft copolymer.

In one embodiment, the modified olefin copolymer may include ethylene-methyl acrylate copolymer (EMA), ethylene-ethyl acrylate copolymer (EEA), ethylene-propylene rubber (EPR), ethylene-propylene-diene copolymer (EPDM), ethylene vinyl alcohol copolymer (EVOH), and mixtures thereof.

The rubber-modified aromatic vinyl graft copolymer may be prepared by graft copolymerization of a monomer mixture including an aromatic vinyl monomer and a vinyl cyanide monomer to a rubber polymer core.

In one embodiment, the rubber-modified aromatic vinyl graft copolymer may have a core (rubber polymer)-shell (copolymer of the monomer mixture) structure.

In one embodiment, the rubber-modified aromatic vinyl graft copolymer may be prepared by polymerization (graft polymerization) of a monomer mixture including an aromatic vinyl monomer, a vinyl cyanide monomer, and, optionally, a monomer for imparting processability and heat resistance with (to) a rubber polymer. Here, polymerization may be carried out by any known polymerization method, such as emulsion polymerization, suspension polymerization, or mass polymerization.

The rubber polymer may include diene rubbers, such as polybutadiene, poly(styrene-butadiene), and poly(acrylonitrile-butadiene), saturated rubbers obtained by adding hydrogen to the diene rubbers, isoprene rubbers, and ethylene-propylene-diene terpolymer (EPDM). These may be used alone or as a mixture thereof. For example, the rubber polymer may include diene rubbers.

The rubber polymer may be present in an amount of about 5 wt % to about 65 wt %, for example, about 10 wt % to about 60 wt %, specifically about 20 wt % to about 50 wt %, based on the total weight of the rubber-modified aromatic vinyl graft copolymer. Within this range, the foam can have good impact resistance. In addition, the rubber polymer (rubber particles) may have an average (z-average) particle diameter of about 0.05 μm to about 6 μm, for example, about 0.15 μm to about 4 μm, specifically about 0.25 μm to about 3.5 μm. Within this range, the foam can have good properties in terms of impact strength and appearance.

In one embodiment, the aromatic vinyl monomer is graft-copolymerizable to the rubber polymer, and examples thereof may include styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene. These may be used alone or as a mixture thereof.

In one embodiment, the aromatic vinyl monomer may be present in an amount of about 10 wt % to about 90 wt %, for example, about 40 wt % to about 90 wt %, based on the total weight of the monomer mixture. Within this range, the foam can have good properties in terms of processability and impact resistance.

In one embodiment, the vinyl cyanide monomer may include, for example, acrylonitrile, methacrylonitrile, ethacrylonitrile, phenylacrylonitrile, α-chloroacrylonitrile, and fumaronitrile. These may be used alone or as a mixture thereof. For example, the vinyl cyanide monomer may include acrylonitrile and methacrylonitrile. The vinyl cyanide monomer may be present in an amount of about 10 wt % to about 90 wt %, for example, about 10 wt % to about 60 wt %, based on the total weight of the monomer mixture. Within this range, the foam can have good chemical resistance and mechanical properties.

In one embodiment, the monomer for imparting processability and heat resistance may include, for example, (meth) acrylic acids, maleic anhydride, and N-substituted maleimide, without being limited thereto. When included in the monomer mixture, the monomer for imparting processability and heat resistance may be present in an amount of about 15 wt % or less, for example, about 0.1 wt % to about 10 wt %, based on the total weight of the monomer mixture. Within this range, the monomer for imparting processability and heat resistance can impart processability and heat resistance to the foam without deterioration in other properties.

In one embodiment, the rubber-modified aromatic vinyl graft copolymer may include, for example, an acrylonitrile-butadiene-styrene graft copolymer (g-ABS) obtained by graft copolymerization of styrene as the aromatic vinyl monomer and acrylonitrile as the vinyl cyanide monomer to polybutadiene rubber.

In one embodiment, the impact modifier may be present in an amount of about 50 parts by weight to about 150 parts by weight relative to 100 parts by weight of the aromatic vinyl resin. Within this range, the foam can have further improved impact resistance. For example, the impact modifier may be present in an amount of about 80 parts by weight to about 120 parts by weight relative to 100 parts by weight of the aromatic vinyl resin.

In one embodiment, the impact modifier and the aromatic vinyl resin may be present in a weight ratio of about 1:0.8 to about 1:3. Within this range, the foam can have good properties in terms of flowability, moldability, and impact resistance. For example, the impact modifier and the aromatic vinyl resin may be present in a weight ratio of about 1:1 to about 1:2.

Compatibilizer

In one embodiment, the first composition may further include a compatibilizer. The compatibilizer may include a maleimide compatibilizer. In one embodiment, the maleimide compatibilizer may include at least one selected from an N-phenyl maleimide-aromatic vinyl compound copolymer and an N-phenyl maleimide-aromatic vinyl compound-maleic anhydride copolymer. For example, the maleimide compatibilizer may include an N-phenyl maleimide-styrene-maleic anhydride copolymer.

In one embodiment, the compatibilizer may be present in an amount of about 20 parts by weight to about 90 parts by weight relative to 100 parts by weight of the aromatic vinyl resin. Within this range, the foam can have good properties in terms of flowability and mold release. For example, the compatibilizer may be present in an amount of about 30 parts by weight to about 70 parts by weight relative to 100 parts by weight of the aromatic vinyl resin. For another example, the compatibilizer may be present in an amount of about 40 parts by weight to about 60 parts by weight relative to 100 parts by weight of the aromatic vinyl resin.

Additives

In one embodiment, at least one of the first composition and the second composition may further include additives used in typical thermoplastic resin compositions. The additives may be additives that do not react with the foaming agent in the process of injection molding after mixing the first extrudate and the second extrudate according to the present invention. Examples of the additives may include a flame retardant, a lubricant, a plasticizer, a heat stabilizer, an antioxidant, a light stabilizer, a colorant, and mixtures thereof, without being limited thereto. The additives may be present in an amount of about 0.001 parts by weight to about 40 parts by weight, for example, about 0.1 parts by weight to about 10 parts by weight, relative to 100 parts by weight of the aromatic vinyl resin.

In one embodiment, the first extrudate and the second extrudate may be kneaded and injection molded at an injection molding temperature of about 250° C. or higher. At this injection molding temperature, the foaming agent can easily react with the aromatic vinyl resin to generate carbon dioxide gas or water vapor, whereby high foaming efficiency can be secured. If the injection molding temperature is less than about 250° C., the foam can have poor heat resistance and impact resistance due to reduction in forming efficiency. For example, the first extrudate and second extrudate may be kneaded and injection molded at an injection molding temperature of about 260° C. to about 350° C.

In one embodiment, each of the first extrudate and the second extrudate may have a specific gravity of 0.8 to 1.6, as measured in accordance with ASTM D792.

In another embodiment, a difference in specific gravity between the first extrudate and the second extrudate may be about 0.5 or less, as measured in accordance with ASTM D792. Within this range, the first extrudate and the second extrudate can have good mixability and moldability, whereby high foaming efficiency can be secured upon production of the foam. For example, a difference in specific gravity between the first extrudate and the second extrudate may be about 0.3 or less. For another example, a difference in specific gravity between the first extrudate and the second extrudate may be about 0.1 or less. For example, a difference in specific gravity between the first extrudate and the second extrudate may be 0, 0.01, 0.02, 0.03, 0.04, 0.05, 0.06, 0.07, 0.08, 0.09, 0.1, 0.2, 0.3, 0.4, or 0.5.

In one embodiment, the reinforcing fillers may be included in at least one of the first extrudate and the second extrudate. For example, the reinforcing fillers may be used in the first extrudate and the second extrudate to adjust specific gravities of the first extrudate and the second extrudate, thereby improving mixability and moldability of the first extrudate and the second extrudate upon kneading and injection molding for production of the foam.

Form Produced by the Method of Producing Foam

Another aspect of the present invention relates to foam produced by the method of producing foam. In one embodiment, the foam has a specific gravity of about 1.0 to about 1.4, for example, about 1.1 to about 1.3, as measured in accordance with ASTM D792, and a notched Izod impact strength of about 4 kgf·cm/cm to about 40 kgf·cm/cm, for example, about 8 kgf·cm/cm to about 40 kgf·cm/cm, as measured on a ¼" thick specimen in accordance with ASTM D256.

The form produced by the method of producing foam according to the present invention is obtained with high foaming efficiency in the injection molding temperature range set forth herein, has good properties in terms of forming uniformity, dimensional stability, impact resistance, and heat resistance, and is lightweight due to low specific gravity thereof. Thus, the foam can be advantageously used as an interior material for vehicles and a material for electronic/electrical devices requiring low specific gravity.

MODE FOR INVENTION

Next, the present invention will be described in more detail with reference to some examples. It should be understood that these examples are provided for illustration only and are not to be in any way construed as limiting the present invention.

EXAMPLES AND COMPARATIVE EXAMPLES

Details of components used in Examples and Comparative Examples are as follows:

(A) Aromatic vinyl resin: A styrene-maleic anhydride copolymer (SZ26120, Polyscope Polymers) having a glass transition temperature (Tg) of 160° C. and a weight average molecular weight of 120,000 g/mol was used.

(B) Impact modifier: An acrylonitrile-butadiene-styrene graft copolymer (rubber-modified aromatic vinyl graft copolymer, Lotte Advanced Materials Co., Ltd.) obtained by graft copolymerization of 42 wt % of styrene and acrylonitrile (weight ratio: 75/25) to 58 wt % of polybutadiene rubber (average particle diameter: 0.27 μm) was used.

(C) Compatibilizer: An N-phenyl maleimide-styrene-maleic anhydride copolymer (maleimide compatibilizer, IP MS-NB, Denka Co., Ltd.) was used.

(D) Reinforcing fillers: Glass fibers (T351/R, NEG Co., Ltd.) having an aspect ratio (L/D) of 2.5, as measured on a bundle thereof, an average particle diameter of 13 μm, and an average length of 3 mm were used.

(E) Polyamide resin: Polyamide 6 (EN300, KP Chemtech) was used.

(F) Forming agent: A montan wax (Montanic ester wax, Clariant Inc.) obtained by mixing low-molecular-weight materials having acid and alcohol groups at the terminal of an aliphatic hydrocarbon, was used.

Examples 1 to 3

Preparation of First Extrudate

A first composition obtained by mixing the aforementioned components in amounts as listed in Table 1 was introduced into a twin screw extruder (L/D: 29, Φ: 45 mm), followed by melt extrusion at 240° C. to prepare strands, which, in turn, were subjected to water-cooling cutting to be pelletized to a size of 3 mm, thereby preparing a first extrudate.

Preparation of Second Extrudate

A second composition obtained by mixing the aforementioned components in amounts as listed in Table 1 was introduced into a twin screw extruder (L/D: 29, Φ: 45 mm), followed by melt extrusion at 220° C. to prepare strands, which, in turn, were subjected to water-cooling cutting to be pelletized to a size of 3 mm, thereby preparing a second extrudate.

Preparation of Form

The prepared first and second extrudates were dry-mixed in a weight ratio of 1:1 and were introduced into an injection machine (clamping force: 170 tons, cylinder diameter: 45 mm), followed by kneading and injection molding at an injection molding temperature of 270° C., thereby preparing a foam specimen for property evaluation.

Comparative Examples 1 to 2

A composition obtained by mixing (A) to (F) in amounts as listed in Table 1 was introduced into a twin screw extruder (L/D: 29, Φ: 45 mm), followed by melt extrusion at 240° C. to prepare strands, which, in turn, were subjected to water-cooling cutting to be pelletized to a size of 3 mm, thereby preparing a third extrudate. Then, the third extrudate was introduced into an injection machine (clamping force: 170 tons, cylinder diameter: 45 mm), followed by kneading and injection molding at an injection molding temperature of 270° C., thereby preparing a foam specimen for property evaluation.

Each of the foam specimens prepared in Examples 1 to 3 and Comparative Examples 1 to 2 was evaluated as to the following properties. Results are shown in Table 1.

Property Evaluation (1) Specific gravity: For Examples 1 to 3, specific gravities of the first extrudate, the second extrudate, and the foam were measured in accordance with ASTM D792, and, for Comparative Examples 1 to 2, specific gravities of the third extrudate and the foam were measured in accordance with ASTM D792.

(2) Forming rate (%): For Examples 1 to 3, a foaming rate was calculated according to Equation 1, and, for Comparative Examples 1 to 2, a foaming rate was calculated according to Equation 2.

$$\text{Forming rate (\%)} = \{(S_{12} - S_P)/S_{12}\} \times 100 \quad \text{[Equation 1]}$$

where $S_{12}$ is an average value of specific gravities of the first extrudate and the second extrudate and $S_P$ is a specific gravity of the foam.

$$\text{Forming rate (\%)} = \{(S_3 - S_P)/S_3)\} \times 100 \quad \text{[Equation 2]}$$

where $S_3$ is a specific gravity of the third extrudate and Sr is a specific gravity of the foam.

(3) Impact strength (kgf·cm/cm): Notched Izod impact strength was measured on a ¼" thick specimen in accordance with ASTM D256.

(4) Tensile strength (kgf/cm$^2$): Tensile strength was measured on each of the specimens prepared in Examples and Comparative Examples in accordance with ASTM D638.

(5) Flexural modulus (kgf/cm$^2$): Flexural modulus was measured on each of the specimens prepared in Examples and Comparative Examples in accordance with ASTM D790.

TABLE 1

| Unit: parts by weight | | Example 1 | Example 2 | Example 3 | Comparative Example 1 | Comparative Example 2 |
|---|---|---|---|---|---|---|
| First composition | (A) Aromatic vinyl resin | 100 | 100 | 100 | 100 | 100 |
| | (B) Impact modifier | 100 | 100 | 100 | 100 | 100 |
| | (C) Compatibilizer | 50 | 50 | 50 | 50 | 50 |
| | (D) Reinforcing fillers | 100 | 43 | — | 150 | 150 |
| Second composition | (E) Polyamide resin | 100 | 100 | 100 | 100 | 100 |
| | (F) Foaming agent | 1 | 1 | 1 | 1 | — |
| | (D) Reinforcing fillers | 50 | 21 | — | — | — |
| Specific gravity of first extrudate | | 1.49 | 1.32 | 1.12 | — | — |
| Specific gravity of second extrudate | | 1.55 | 1.37 | 1.13 | — | — |
| Specific gravity of third extrudate | | — | — | — | 1.49 | 1.54 |
| Specific gravity of foam | | 1.21 | 1.08 | 1.09 | 1.39 | 1.53 |
| Foaming rate (%) | | 20.39 | 19.70 | 3.11 | 6.71 | 0.65 |
| Impact strength (kgf · cm/cm) | | 9.6 | 5.5 | 36.2 | 9.2 | 9.9 |
| Tensile strength (kgf/cm$^2$) | | 1,020 | 770 | 540 | 1,010 | 1,040 |
| Flexural strength (kgf/cm$^2$) | | 65,700 | 41,400 | 22,400 | 65,700 | 66,300 |

Referring to Table 1, the foams of Examples 1 to 3 according to the present invention had lower specific gravity than the foams of Comparative Examples 1 to 2. Conversely, the foam of Comparative Example 1, deviating from the conditions specified in the present invention, and the foam of Comparative Example 2, free from the foaming agent according to the present invention, had much higher specific gravity than the foams of Examples 1 to 3.

FIG. 1(a) is a scanning electron microscopy (SEM) image showing a cross-section of the first extrudate of Example 1, FIG. 1(b) is an SEM image showing a cross-section of the second extrudate of Example 1, and FIG. 1(c) is an SEM image showing a cross-section of the third extrudate of Comparative Example 1. Referring to FIG. 1, the first extrudate and the second extrudate of Example 1 according to the present invention were not formed. Conversely, the third extrudate of Comparative Example 1, deviating from the conditions specified in the present invention, was formed through reaction of the aromatic vinyl resin with the foaming agent in the process of pelletization through extrusion, causing deterioration in forming efficiency upon injection molding.

It should be understood that various modifications, changes, alterations, and equivalent embodiments can be made by those skilled in the art without departing from the spirit and scope of the invention.

The invention claimed is:

1. A method of producing a foam, comprising:
producing the foam by kneading and injection molding a first extrudate and a second extrudate,
wherein the first extrudate is obtained by extruding a first composition comprising an aromatic vinyl resin and the second extrudate is obtained by extruding a second composition comprising a polyamide resin and a foaming agent.

2. The method according to claim 1, wherein the first composition and/or the second composition further comprises reinforcing fillers, the reinforcing fillers comprising carbon fibers, glass fibers, and/or mineral fillers.

3. The method according to claim 1, wherein the aromatic vinyl resin has a glass transition temperature (Tg) of about 130° C. to about 180° C. and a weight average molecular weight of about 50,000 g/mol to about 200,000 g/mol.

4. The method according to claim 1, wherein the polyamide resin is an aliphatic polyamide resin.

5. The method according to claim 1, wherein the foam comprises about 50 parts by weight to about 250 parts by weight of the polyamide resin and 0.01 parts by weight to about 15 parts by weight of the foaming agent relative to 100 parts by weight of the aromatic vinyl resin.

6. The method according to claim 2, wherein the foam comprises the reinforcing fillers of the first composition and/or of the second composition in an amount of about 40 parts by weight to about 200 parts by weight relative to 100 parts by weight of the aromatic vinyl resin.

7. The method according to claim 1, wherein the polyamide resin and the aromatic vinyl resin are present in a weight ratio of about 1:0.5 to about 1:2.

8. The method according to claim 1, wherein the first composition and/or the second composition further comprises an impact modifier.

9. The method according to claim 8, wherein the foam comprises the impact modifier of the first composition and/or the second composition and the aromatic vinyl resin in a weight ratio of 1:0.8 to 1:3.

10. The method according to claim 1, wherein the first composition further comprises a compatibilizer.

11. The method according to claim 1, wherein the foaming agent comprises a montan wax.

12. The method according to claim 1, wherein a difference in specific gravity between the first extrudate and the second extrudate is about 0.5 or less, as measured in accordance with ASTM D792.

13. The method according to claim 1, wherein the first extrudate and the second extrudate are kneaded and injection molded at an injection molding temperature of about 250° C. or higher.

14. A form produced by the method according to claim 1.

15. The form according to claim 14, wherein the foam has a specific gravity of about 1.0 to about 1.4, as measured in accordance with ASTM D792, and a notched Izod impact strength of about 4 kgf·cm/cm to about 40 kgf·cm/cm, as measured on a ¼" thick specimen in accordance with ASTM D256.

* * * * *